United States Patent [19]
Gray, Jr.

[11] 3,773,484
[45] Nov. 20, 1973

[54] METHOD FOR MAKING HEAT EXCHANGE MATRIX BY CRYSTALLATION
[75] Inventor: Marion I. Gray, Jr., Toledo, Ohio
[73] Assignee: Owens-Illinois, Inc., Toledo, Ohio
[22] Filed: Aug. 5, 1971
[21] Appl. No.: 169,216

[52] U.S. Cl. .................. 65/4, 65/33, 65/DIG. 7, 65/43, 65/152, 65/156, 65/DIG. 9
[51] Int. Cl. ... C03c 23/20, C03b 29/00, C03c 27/00
[58] Field of Search ................. 65/33, DIG. 7, 4, 65/43, 152, 158, DIG. 9

[56] References Cited
UNITED STATES PATENTS

| 3,246,972 | 4/1966 | Smith | 65/33 X |
| 2,992,956 | 7/1961 | Bazinet, Jr. | 65/DIG. 7 |
| 3,279,931 | 10/1966 | Olcott | 65/33 X |
| 3,282,711 | 11/1966 | Lin | 65/33 X |
| 3,325,266 | 6/1967 | Stong | 65/33 |
| 3,514,275 | 5/1970 | Brav | 65/33 |
| 3,535,098 | 10/1970 | Babcock | 65/33 |
| 3,275,428 | 9/1966 | Siegmund | 65/DIG. 7 |
| 3,331,670 | 7/1967 | Cole | 65/DIG. 7 |
| 3,248,464 | 4/1966 | Telkes | 65/DIG. 7 |
| 3,269,817 | 8/1966 | Bondley | 65/4 |
| 3,661,546 | 5/1972 | Busdiecker et al. | 65/33 |
| 3,582,301 | 6/1971 | Andrysiak et al. | 65/DIG. 7 |
| 3,677,730 | 7/1972 | Deradoorian et al. | 65/4 X |
| 3,679,384 | 7/1972 | Colson et al. | 64/4 X |

OTHER PUBLICATIONS
Handbook of Glass Manufacture Vol. II – Fay V. Tooley – 1961 Page 1 192-199.

Primary Examiner—Frank W. Miga
Attorney—E. J. Holler et al.

[57] ABSTRACT

Disclosed is an improved assembly or matrix in which a plurality of open-ended, glass-ceramic tubes are disposed in axially parallel relation. The tubes are rigidified into a matrix structure along with additional glass-ceramic material interposed in the interstices between the tubes. The tubes are integrally bound to each other at their tube contact areas. The interposed glass-ceramic material integrally binds together the surfaces of the tubes facing the interstices between the tubes. The additional glass-ceramic material also provides a wear resistant, tube-reinforcing surface intermediate the open ends of the tubes defining the end faces of the assembly. The invention also comprehends the method of reinforcing a matrix of this type by interposing a finely divided, thermally crystallizable frit or other forms of low expansion crystallizable glass between individual, sealed, matrix-defining glass tubes and jointly thermally processing the tubes and the frit or other form of crystallizable glass to convert both the tubes and the interposed material to low-expansion, glass-ceramic materials of substantially the same thermal expansion characteristics. Following such thermal processing, the end of the tubes may be removed to provide a flow-through matrix structure, with the interposed material being exposed between the open ends of the tubes to provide a wear-resistant surface.

19 Claims, 7 Drawing Figures

PATENTED NOV 20 1973 3,773,484

INVENTOR.
MARION I. GRAY, JR

BY *E.J. Haller*
*Charles S. Lynch*
ATTORNEYS

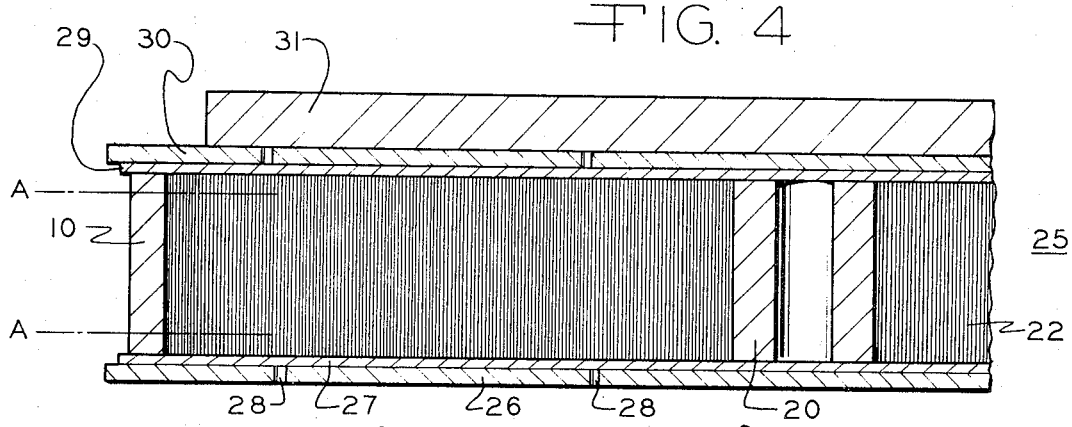
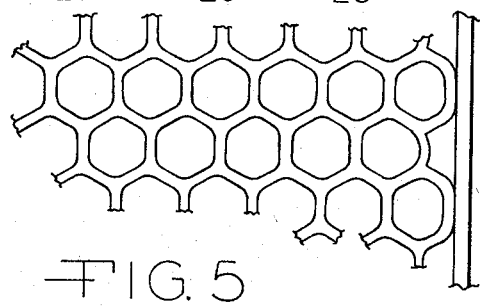
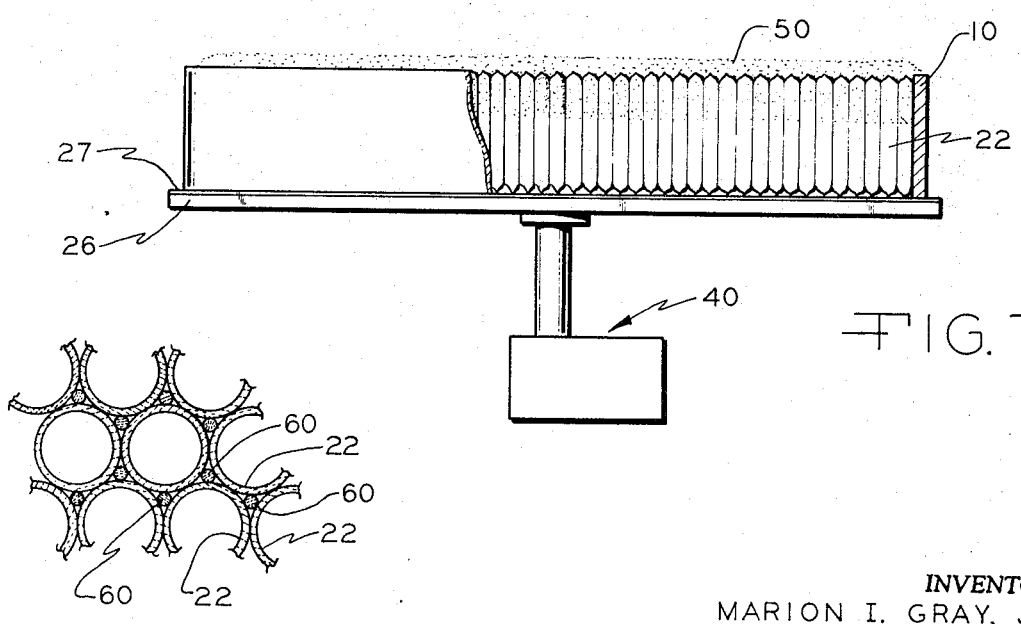

METHOD FOR MAKING HEAT EXCHANGE MATRIX BY CRYSTALLATION

BACKGROUND OF THE INVENTION

This invention constitutes an improvement over the structure and method disclosed in the application of Y. K. Pei, Ser. No. 30,859, filed in the United States Patent Office on Apr. 22, 1970, and assigned to the assignee of the present invention.

In the above-noted application of Pei, there is disclosed an assembly or matrix of integrally fused tubes useful as a compact regenerative heat exchanger, bouyancy material, sound absorption material, heat insulation material, and the like. The advantages of this type of structure and the requirements for each of the structures of this type, particularly a regenerator structure, are set forth fully in the Pei application and need not be repeated here.

In the Pei application, there is disclosed a regenerator structure which consists of a plurality of individual, axially parallel, open ended glass-ceramic tubes which are thermally bonded to one another and integrated into an overall regenerator structure. Gas flow through the regenerator occurs through the individual tubes, one open end of each tube forming an inlet and the other open end of the tube forming the outlet. In a typical thermal regenerator installation, one or both faces of the regenerator is contacted by a seal bar. The regenerator matrix is rotated relative to the seal bar which is urged against the regenerator end surface under an appreciable axial load. Because of matrix end face-seal bar contact under the sealing load, some abrasive wearing of the matrix end face may well occur over an extended service period, particularly since the matrix end face is defined by the open ends of the individual tubes. Additionally, the strength of the matrix and its ability to withstand axially or radially applied loads in operation is dependent upon the degree of integral bonding between adjacent tubes. While matrices made in accordance with the disclosure of the Pei application are capable of functioning as regenerators or other structures disclosed therein, any increase in the resistance of the matrix end faces to wear and any increase in the strength of the matrix itself would be quite welcome.

SUMMARY OF THE INVENTION

The present invention provides a matrix similar to that disclosed in the Pei application, but having the dual characteristics of (1) increased structural strength and (2) increased abrasion resistance at the open end faces of a matrix.

This dual improvement is accomplished by reinforcing the matrix with a low expansion thermally crystallizable glass which is interposed in the interstices between the tubes. This interposed material serves (1) to bond the tubes to one another and (2) to provide a wear-resistant, tube-reinforcing surface at the seal-engaging surfaces of the matrix.

In a preferred embodiment of the method taught herein, a matrix of the type disclosed in the Pei application is reinforced by interposing a finely divided, thermally crystallizable frit between the individual, sealed, matrix-defining glass tubes prior to the thermal conversion of the tubes to a glass ceramic. Subsequently, the thermally crystallizable frit and the individual tubes are jointly thermally processed through successive nucleating and crystallizing steps to simultaneously convert both the tubes and the frit to low expansion glass-ceramic materials having substantially the same thermal expansion characteristics. During this joint thermal processing, the internal pressures generated in the closed tubes and the thermal sintering of the frit combine to compact and to integrate the tube-frit assembly into a single mass. After the nucleation and crystallizing steps have been carried out, the ends of the tubes may be ground or cut off to provide a flow-through matrix through the now opened ends of the tube. The frit is interposed between the ground or cut open ends of the tubes, and serves to reinforce the ends of the tubes and to provide an additional, wear-resistant surface for the matrix assembly.

It is, therefore, an important object of this invention to provide a matrix structure or similar assembly of improved strength and wear-resistance properties by incorporating into the matrix a glass-ceramic material having thermal expansion characteristics compatible with that of the glass-ceramic tubes forming the primary matrix structure.

Another important object of this invention is the provision of a method of making a reinforced glass-ceramic matrix by the steps of assembling a plurality of individual, closed-end tubes of thermally crystallizable glass-ceramic material, providing in the interstices between the individual sealed tubes a powdered thermally crystallizable low expansion glass, and jointly thermally processing the tubes and the powdered glass to convert both to low expansion glass-ceramic materials of substantially the same thermal expansion characteristics.

It is a further important object of this invention to provide a matrix in which a plurality of tightly packed individually axially elongated tubes are arranged with their axes parallel and a sintered frit is interposed between the tubes to join the sidewalls of the tubes to one another into an integral mass, both the tubes and the frit being formed of low expansion glass-ceramic materials.

Yet another, and no less important, object of this invention is the provision of a method of forming an assembly of glass-ceramic tubes by interposing between the tubes a thermally crystallizable frit, and jointly and successively nucleating and crystallizing both the tubes and the frit, thereby converting both the tubes and the frit to low expansion glass-ceramic materials.

Other objects, features and advantages will become apparent from the following description taken in conjunction with the accompanying drawings, in which:

FIG. 4 is a partial cross-sectional view of the structure of FIG. 1 placed within an assembly prior to treatment;

FIG. 5 is a view of an open end face of a matrix illustrating the teachings of this invention;

FIG. 6 is an enlarged plan view of a section of an alternative embodiment of the teachings of this invention; and FIG. 7 is a view similar to FIG. 4 but illustrating a modified apparatus of the present invention.

DESCRIPTION OF THE PREFERRED EMBODIMENTS

Figure 1:
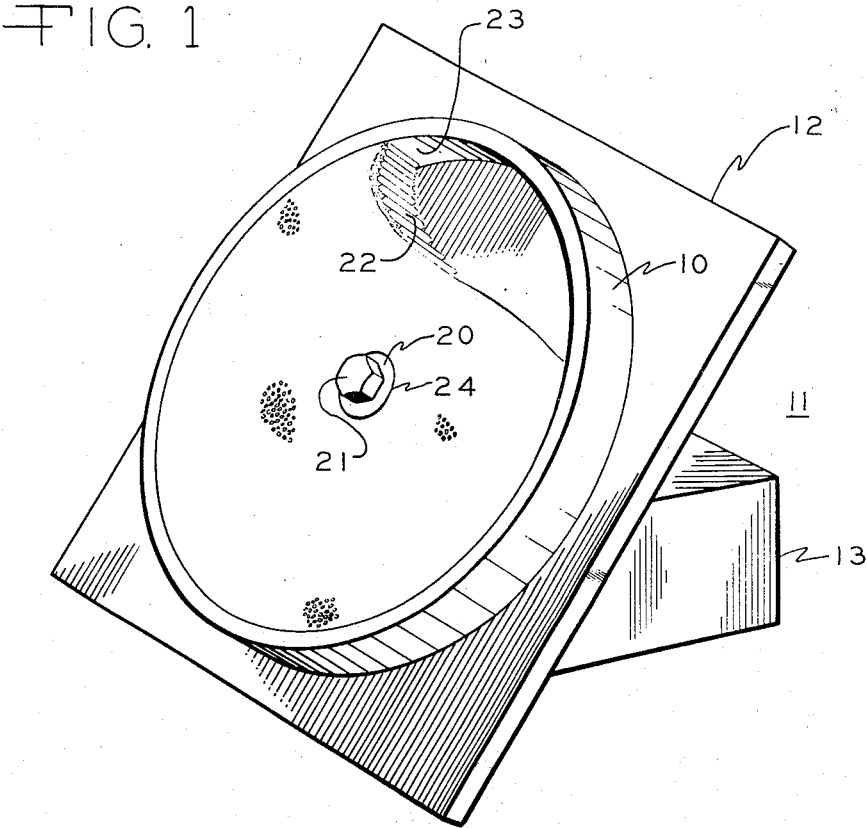
FIG. 1 is a perspective view of a jig assembly utilized in making an embodiment of the structure of the invention and showing a partial packing of tubes within the structure mounted on the assembly.

As shown in the drawings, FIG. 1, reference number 10 refers generally to an apparatus which is substantially identical to that apparatus illustrated in FIG. 1 of the above-identified application of Y. K. Pei.

As illustrated in FIG. 1, a ceramic rim 10 is mounted on a jig 11 comprising a face board 12 attached to a conventional vibrator 13. Clamping means (not shown) are spaced about the edges of face board 12 and removably secure the rim 10 thereto in the manner noted in the copending Pei application.

A hub 20 may be also removably mounted on the face board 12 and disposed at the center of the rim. Fastener 21 passing through the hub 20 is secured to the face board 12 and maintains the hub in position on the jig. A plurality of hollow, thin-walled thermally crystallizable glass tubes 22 are then closely packed together with the rim in parallel relationship as illustrated in FIG. 1, i.e., the tubes are parallel to the inner wall 23 of the rim and the outer wall 24 of the hub and the longitudinal axes of the tubes are essentially parallel.

Figure 2:
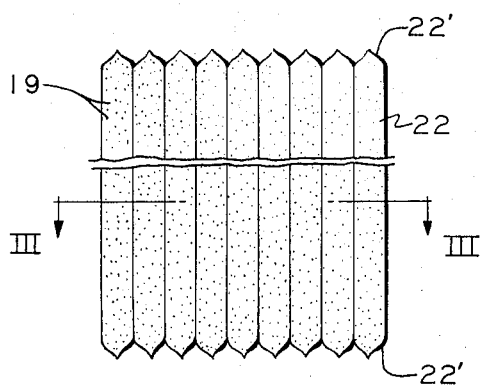
FIG. 2 is an enlarged view of a portion of the assembled tubes in FIG. 1.
Figure 3:
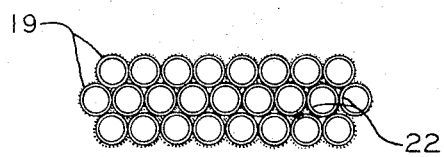
FIG. 3 is a cross-sectional view of the tubes illustrated in FIG. 2, the section being taken along lines III—III of FIG. 2.

An enlarged view of a portion of the assembled tubes 22 is shown in FIG. 2, and a cross-sectional view of the tubes illustrated in FIG. 2 is shown in FIG. 3. Each of the glass tubes 22 have both ends 22' sealed, thus trapping air or another thermally expansible fluid medium therein. A tube 22 may have its ends sealed by simply passing the tube end through a flame. Due to the very small size of the tube, the outer diameter of which may, for example, be about 0.030 inches and the wall thickness may be about 0.001 to 0.003 inches, end sealing is readily achieved. However, the method of sealing the tubes is not a part of this invention, and any of the known methods may be used.

In a manner to be hereinafter more fully described, each of the glass tubes 22 is coated with a sinterable thermally crystallizable frit 19. The entire exterior surfaces of these tubes preferably are coated with frit compositions hereinafter identified.

Because it is often desirable and important to have the glass tubes 11 as closely packed as possible so that each tube is in contact with six other tubes, as shown in FIG. 3, the jig 11 is provided with a vibrator 13 which, in turn, causes face board 12 and rim 10 to vibrate (by means not shown). This vibration is imparted to the plurality of glass tubes 22 and assists in more closely packing the tubes as they are placed on top of the tubes which have already been packed. It is to be understood that the rim 10 need not be manually packed, but can be packed by other methods. In either event, the vibration imparted to the glass tubes should be sufficient to ensure the close, tight packing of the tubes within the rim, with each tube in contact with six other tubes.

The assembly 25 comprising the rim 10, hub 20 and the closely-packed glass tubes 22 is removed from the jig 11 and placed upon a stainless steel plate 26 having a silica-alumina (Fiberfrax) cloth 27 on its upper surface, as shown in FIG. 4. Plate 26 is provided with a plurality of perforations 28. Another silica-alumina cloth 29 is placed on the upper surface of the assembly 25, and a second perforated stainless steel plate 30 is placed thereover. A heavy member 31 is fully placed on top of plate 30, and the entire assembly is then placed in a furnace and subjected to heat sufficient to soften the glass walls of tubes 22 and cause the walls to bloat or expand due to the heating of the fluid medium in each tube so that adjoining, contacting wall surfaces are fused together to form a unitary matrix.

During the bloating or expanding of the tubes and the fusion of the tube wall surfaces into the unitary matrix, the finely divided firt will sinter and will distribute itself in the interstices between the tube walls to aid in securing the walls to one another. This frit interposed in the interstices between the tubes is subjected to substantial pressures generated by the expansion of the tubing walls. The resultant sintering, melting, and distribution of the frit will adhere the expanded tube walls to one another and to its own sintered glass-ceramic mass. The tube walls are therefore insured of support by another tube wall or by the sintered frit in the interstices.

It is important to have the ends of each of the tubes 22 in assembly 25 sealed during the heating step, otherwise the tube walls will collapse rather than expand when subjected to this heat. Furthermore, to utilize the heating procedure described above with respect to the FIG. 4 assembly, the length of the tubes should be no longer than the height of the rim 10. As the individual tubes expand, any air or other gases which remains in the interstices passes through the perforations in the plates 26 and 30. If desired, plates 26 and 30 need not be perforated, and the assembly can be placed under vacuum during the heating step to assist in the removal of any air which is within the interstices between the tubes.

The heating of the thin-walled tubes expands them into close contact with each other and into the interstices between tubes to a greater or lesser extent, ideally to an extent to substantially completely fill the interstices between the tubes and between the tubes and walls of the rim and hub when there is no powdered material in the interstices. In the latter event the resulting tubes become essentially hexagonal. In the present instance, the glass tubes are fusing together where they contact. The frit interposed in the interstices between the tubes is compacted by the expansion of the tube walls, and sinters and fuses to itself and to the tube walls. Further, the tubes and the frit both are also undergoing nucleation during the heat treatment, and heating of the structure is continued for a time sufficient to in situ crystallize the glass tubes and frit to an at least partially crystalline material, commonly referred to as a glass-ceramic.

The rim and hub can be formed of a conventional inorganic crystalline oxide ceramic, made by firing and sintering particulate inorganic oxide materials. The rim and hub, as well as the frit, should have an average coefficient of lineal thermal expansion compatible with that of the low expansion material of the matrix. In a preferred embodiment of the invention, the frit, the rim and hub are all formed of a glass-ceramic having physical properties, including thermal expansion and contraction properties, which are close to, and usually the same as, those of the crystalline matrix comprising the fused tubes.

After the assembly 25 has been crystallized, and usually after cooling to room temperature, the outer surface portions of the assembly may be removed by sawing with a diamond saw in the direction indicated by lines A in FIG. 4. An assembly of apredetermined thickness is thus obtained, and all of the fused tubes now have open channels since both sealed ends of each tube have been cut away. Alternatively, the ends of the tubes may be left sealed to provide a cellular structure as described hereinbefore, except that the ends are sealed and the cells or passageways are enclosed. The product so produced has exceptional buoyancy for a ceramic product, and can be used as a non-inflammable, chemically inert buoyancy material in life rafts, for instance, and for other applications where buoyancy is desired. Furthermore, the tubes may be opened only on one end to provide a sound absorption material which is fireproof and can be used in sound absorption applications in ceilings of rooms or other sound absorption applications. Furthermore, either of the latter two materials, with one or both ends sealed, is useful as an extremely lightweight heat insulation material, especially where chemical durability or fire resistance is desired.

The removal of the ends of the tubes exposes the end faces of the tube side walls, as well as the frit interposed between such side walls. The open-ended surfaces at each end of the assembly are defined by the combination of tubes and frit. Thus the open end surface is substantially reinforced to provide an immensely improved wear-resistance. Further, the sintered frit in the interstices of the tubes between the ends of the tubes has filled all empty spaces between tubes and adhered all tube walls together to provide a substantial improvement in resistance to inwardly and outwardly directed radial forces.

In the method of this embodiment of the invention, the ends 25 of tubes 22 are appropriately sealed, e.g., by means of a flame, either before, after, or during the bundling of the tubes. Typically, the tubes are sealed in a gaseous environment, so as to trap the environmental gas within each tube at the surrounding ambient pressure. On heating to effect fusion sealing, the gas within each tube expands so as to prevent collapse of the tubes. With the thin-walled tubes used in this invention, expansion of the entrapped gas causes the tubes to bloat or expand. In a preferred embodiment the expansion is effected until the space between adjacent tubes is filled with the expanded tubes walls and the compacted frit. When the tubes are bundled so that each tube is in contact with six adjacent tubes, as shown in FIG. 3, the tubes and interstitial frit are reformed into substantially hexagonal shape to provide the matrix structure illustrated in FIG. 5. It will be noted in FIG. 5 that the inside corners of the interior hexagonal cross-section of each tube are slightly rounded or flattened. This occurs since the interstially interposed frit can be compacted only so far before it is merged into and increases the wall size of each of the wall portions of the three tubes surrounding an interstice and expanding into the interstice. Thus there is a substantial reinforcement of the interstial areas of the matrix, both through the addition of fused glass-ceramic material and by the prevention of the occurrence of an unsupported tube wall if one or more of the three tube walls do not expand sufficiently to meet the other tube walls in the interstice. The wall-to-wall pressure created by expansion of the tubes has been found effective to form tube-to-tube seals and tube-to-frit-to-tube seals which knit the entire aggregate into an integral, unitary structure having substantially improved mechanical properties.

Tubing used in practicing one preferred embodiment of the method of this invention has a maximum inner diameter of up to about 0.1 inch, a wall thickness of 0.001 to 0.003 inch and an inside diameter to wall thickness ratio of at least 6; substantially lower inside diameter to wall thickness ratios may result in a relative ineffectiveness of the process to urge the tubes and frit into a good fusion bond when using a temperature schedule which is also effective to properly nucleate and crystallize the glass tubes to a glass-ceramic during the expanding and fusion heating cycle. In a now preferred embodiment of the invention the ratio of the inner diameter to the wall thickness of the thermally crystallizable glass tubes is at least 7.2; when tubes having such diameter to wall thickness ratio are employed, the unique structure of the invention is made wherein the open frontal or cross sectional area of the resulting matrix structure is at least 65 per cent.

Usually, round thermally crystallizable glass tubing is used in forming the matrix structure of the invention. Drawing of round glass tubing to controlled dimensions is an old, established art in industry.

The assembled tubes 22 can merely be fusion sealed with slight expansion and reformation of the tubes, but if reinforcement of the tube walls is desired a greater pack density of tubes and frit must be provided to make up for the lack of expansion of the tubes. It is preferred for most applications that the tubes be expanded and reformed into the substantially hexagonal shape during fusion sealing. Greater tube-to-tube pressure is generated causing a more perfect fusion of each tube to the surrounding tubes and to the compacted and sintered frit in the interstices. Tube-to-tube contact area increases from essentially tangential contact with adjacent tubes to essentially full contact, with bonding of the entire periphery of the tubes and the frit in the interstices. Furthermore, as the "triangular" space between each set of three adjacent tubes (see FIG. 3) is substantially reduced in area expansion and reformation, the pressure drop in the finished product across the honeycomb structure is less than across one in which tubing is round in the final product. The thinner the wall thickness for a given composition and the greater the ratio of the inner diameter to such a wall thickness, the more readily the tube can be expanded to a substantially hexagonal tube at a given temperature.

Well suited for use in the method of this invention are thermally crystallizable glasses that are convertible by heating to glass-ceramic bodies. As used herein, a glass-ceramic is an inorganic, essentially crystalline oxide ceramic material derived from an amorphous inorganic glass by in situ bulk thermal crystallization.

Prior to thermal in situ bulk crystallization, the thermally crystallizable glasses can be drawn into tubing using conventional glass forming techniques and equipment. After being assembled in the manner shown in FIGS. 1 and 4, the thermally crystallizable glass tubes are subjected to a controlled heat treatment until the tubes have been expanded and fusion sealed and crystallization has been effected.

Thermally crystallizable glass compositions and the glass-ceramics resulting from thermal in situ crystallization thereof which are useful in the method and product of this invention are those which have, in their crystallized state, a coefficient of thermal expansion in the range from $-18$ to $+50 \times 10^{-7}/°C$ over the range 0°–300°C. The compositions usually used are those containing lithia, alumina and silica, together with one or more nucleating agents including $TiO_2$, $ZrO_2$, $SnO_2$, or other known nucleating agents. In general, such compositions containing in weight per cent about 64 to 79 $SiO_2$, about 13 to 25 $Al_2O_3$ and about 2 to 6 $Li_2O$, together with about 1.2 to 4 weight per cent of nucleating agents selected from one or more of $TiO_2$, $ZrO_2$ and $SnO_2$, can be employed. Preferably, not more than about 2.5 weight per cent $TiO_2$ is usually used or the crystallization is undesirably rapid to be compatible with the fullest expansion of the tubes in the bloating process. Other ingredients can be present in small amounts, as is understood in the art, such as even as much as four or five weight per cent ZnO, up to as much as three or four weight per cent CaO, up to as much as eight per cent MgO, and up to as much as five per cent BaO, so long as the silica plus alumina plus lithia and the nucleating agent(s) are at least bout 85, usually 90, weight per cent of the total glass and the glass composition will thermally crystallize to a glass-ceramic having the desired low expansion of −18 to +50 × $10^{-7}$/°C. Exemplary compositions which can be used in the process of the invention include those compositions disclosed in U.S. Pat. No. 3,380,818, those compositions disclosed in U.S. Ser. No. 464,147 filed June 15, 1965, and corresponding British Pat. Nos. 1,124,001 and 1,124,002, dated Dec. 9, 1968, and also those compositions disclosed in application Ser. No. 866,168 filed Oct. 13, 1969, and corresponding Netherlands printed U.S. Pat. application 6,805,259.

As exemplary of suitable matrix tube compositions, the following specific formulations are presented:

TABLE I

EXAMPLES OF SUITABLE MATRIX TUBE COMPOSITIONS

| INGREDIENT | WEIGHT PER CENT | | | |
|---|---|---|---|---|
| | I | II | III | IV |
| $SiO_2$ | 73.0 | 75.8 | 70.6 | 68.6 |
| $Al_2O_3$ | 17.65 | 16.8 | 19.7 | 21.3 |
| $Li_2O$ | 4.15 | 4.44 | 3.7 | 4.0 |
| ZnO | 1.7 | | 1.7 | |
| $TiO_2$ | 1.4 | 1.84 | 1.7 | 2.0 |
| $ZrO_2$ | 1.6 | 1.17 | 1.5 | 1.6 |
| $Na_2O$ | 0.1 | 0.55 | 0.4 | 0.4 |
| $Cl_2$ | 0.1 | | 0.1 | |
| $Sb_2O_3$ | 0.3 | | 0.5 | 0.3 |
| $K_2O$ | | | 0.2 | 0.2 |
| $F_2$ | | | 0.1 | |
| MgO | | | | 0.1 |

As exemplary of suitable frit compositions of which can be utilized, the following compositions are presented:

TABLE II

EXAMPLES OF SUMMARY FRIT COMPOSITIONS

| | WEIGHT PER CENT | | |
|---|---|---|---|
| | I | II | III |
| $SiO_2$ | 54.6 | 75.8 | 73.0 |
| $Al_2O_3$ | 25.5 | 16.8 | 17.65 |
| $B_2O_3$ | 2.2 | | |
| $Fe_2O_3$ | 0.03 | | |
| $TiO_2$ | 0.14 | 1.84 | 1.4 |
| $ZrO_2$ | 2.67 | 1.17 | 1.6 |
| PbO | 0.50 | | |
| CaO | 0.01 | | |
| MgO | 0.02 | | |
| ZnO | 0.04 | | 1.7 |
| $Na_2O$ | 0.9 | 0.55 | 0.1 |
| $K_2O$ | 4.10 | | |
| $Li_2O$ | 8.0 | 4.44 | 4.15 |
| $F_2$ | 0.13 | | |
| $Cl_2$ | | | 0.1 |
| $Sb_2O_3$ | | | 0.3 |

In any event, the thermally crystallizable glass tubings in the lithia-alumina-silica field containing nucleating agents as before described, are assembled as previously set forth and the constrained bundles of sealed tubing (containing a heat expansible fluid) are heated at any suitable rate that will not thermally shock the tubing up to a temperature range in the maximum nucleating range of the glass. The maximum nucleation range can be determined for all such glasses by the general method outlined in Smith U.S. Pat. No. 3,380,818 beginning at column 9, line 43.

For the process of the present invention where sealing is to be effected or initiated while nucleation is occurring, it is preferred that the assembled tubes be heated in the range 50° to 250° above the annealing point for a period of 1 hour or more. This time can be extended to 10 or 20 hours, and even longer times are not harmful. During this time of heating in such temperature range nucleation is effected, as well as fusion aided by pressure exerted by expansion of the entrapped fluid. Thereafter, the temperature is raised to a higher temperature than the first heating range, which higher temperature is at least 200°F. above the annealing point temperature or may be as high as the final crystallization temperature (usually 1,800° to 2300°F). The final crystallization can be effected at any such temperature range higher than the nucleation-expansion-fusion temperature (50° to 250°F above the annealing point temperature) and can be as low as 200°F above the annealing point or as high as 2300°F or as high as the upper liquids temperature. If the final crystallization is effected at temperatures no more than 400° or 500°F above the annealing point, then the product will not have as high temperature stability as is desired for gas turbine use, but the product will be of the desired low expansion glass-ceramic.

In any event, in this second stage of heating further expansion and the beginning of crystallization is effected, followed by the completion of crystallization on continued heating to a degree such that the matrix material has an expansion in the range from −18 to +50 × $10^{-7}$/°C over the range 0°–300°C.

While the temperature may be raised directly to the final crystallization temperature at a furnace heating rate of at least 50°F per hour, it is usually preferred to allow crystallization to be effected slowly while further expansion and concomitant fusion is being effected by having an intermediate step between the first nucleation-and-fusion temperature range and the final crystallization temperature, which range is usually from 200°F to about 500°F above the annealing point of the original glass. Exemplary holding times in this intermediate range are from 1 to 8 hours, after which the assembly is heated up to the final crystallization temperature, usually in the range of from about 1,800° to 2,300°F.

Obviously, no specific heat treatment instructions can be given suitable for all thermally crystallizable glass compositions. As is well known, glass-ceramics do not have adequate strength if they are not sufficiently nucleated before crystals are allowed to grow appreciably in size, so that routine experiments known to those skilled in the art are used to determine what length of time is best to obtain an adequate number of crystallization centers or nuclei in the glass in the nucleation temperature range of 50° to 250°F above the annealing point.

Another point that must be kept in mind is that, if it is an object to obtain appreciable expansion beyond that necessary to get good fusion between the tubes, in other words to get appreciable reshaping of the tubes to fuse with the frit in the interstices to completely fill the interstices between the tubing, one should not raise the temperature too slowly when going from the nucleation temperature range to the intermediate range, since a rigid crystalline netword may begin to set in and to prevent further expansion. It is found some compositions can be heated at a rate as low as 50°F per hour to this intermediate temperature range and still get sufficient expansion of the tubing effective to form the substantially hexagonal passages (round tubes used in close-packed configuration). On the other hand, some compositions have been found not to fully expand unless the heating rate from the initial nucleation-fusion temperature range to the intermediate temperature range is on the order of at least 200°F per hour and preferably at least 300°F per hour.

The length of time of heating in the final crystallization temperature range of 1,800°F to about 2,300°F is from one-half hour to 5 or 6 hours, although longer times are in no way deleterious. After the crystallization has been completed, the structure can be cooled at furnace rate or in air when the structure is of such low expansion that thermal shock will not harm it.

When making a regenerator having a rim or having a rim and a hub, the rim, as stated, can be made of a thermally crystallizable glass that is the restraining means in which the tubes are initially packed, and the rim can be heat treated concomitantly with the tubes and the interstitial frit, which seal to the rim during the process.

If, however, a rim of considerable thickness is desired and rapid heating rates such as 200° or 300°F per hour are used in the heat treatment of the matrix as just described, the glass of the rim may crack from thermal shock. In such case it is possible to per-heat treat the rim to a partially crystallized state until it is a relatively low expansion material having an expansion coefficient less than 20 to 25 × $10^{-7}$/°C. This can be accomplished by using a suitable nucleation and crystallization heat treatment where the top crystallization temperature is on the order of 1,450° to 1,600°F and the crystallization is effected only long enough to bring the coefficient of expansion down to the desired range. This partially heat treated rim then can be used as the restraining means without fear of thermal shock. It is also possible to use a fully heat treated glass-ceramic rim or a fully formed and heat treated rim made of a low expansion sintered ceramic material known in the art, such as ceramic materials that can be made, for instance, from powdered petalite by suitable sintering methods known in the art. What has been said with respect to the rim also applies to regenerators having a hub of ceramic or glass-ceramic material.

After the heat treatment just described, the product may now be cooled and the sealed ends of the tubes cut or ground away to open each tube to atmospheric pressure. Alternatively, if the intermediate step of heat treating is employed, the heat treatment can be interrupted after this intermediate step and cooled somewhat or even cooled to room temperature, and the ends of the tubes cut or ground away and opened to atmospheric pressure. Then the assembly can be heated up again into the final crystallization heat treatment range, where further crystallization is effected. As will be understood by those skilled in the art, the crystals after this second stage of heat treatment may be in the beta-eucryptite or beta-eucriptite-like state, as is referred to in the references Smith U.S. Pat. No. 3,380,818, and already be highly crystallized and of a low expansion. The final heat treatment will cause further crystallization and conversion of the eucryptite-like crystals to beta-spodumene or beta-spodumene-like crystals, as is also described in the cited Smith patent.

The following examples will serve to illustrate the invention without in any way limiting it, since modifications will be readily apparent to those having ordinary skill in the art.

EXAMPLE I

Glass tubing formed from composition III of Table I having an average outside diameter of 0.030 inch, average inside diameter of 0.026 inch, and an average wall thickness of 0.002 inch and having an average length of 3.5 inches, the tubing having closed ends, are closely packed into a mold similar to that illustrated in FIG. 1. The tubes, prior to assembly, are coated with a slurry containing a powdered mixture consisting of 85 per cent by weight of composition II of Table II and 15 per cent by weight of composition I of Table II in a vehicle consisting of amyl acetate with 1.2 per cent nitrocellulose, in a ratio of 3.5:1 to 2:1 (by weight) solids to vehicle.

The ring mold, tubes, and frit coating are then combined into the assembly 25 of FIG. 4 and heated in a furnace on the following schedule.

| Temperature | Time or Rate |
|---|---|
| Ambient to 800°F | 300°F/hr. |
| Hold at 800°F | One hr. |
| 800°F to 1350°F | 300°F/hr. |
| Hold at 1350°F | Three hrs. |
| 1350°F to 1850°F | 300°F/hr. |
| 1850°F to 2100°F | 50°F/hr. |
| Hold at 2100°F | Four hrs. |
| 2100°F to 1800°F | 50°F/hr. |
| 1800°F to Ambient | 200°F/hr. |

After this heat treatment, the resulting glass-ceramic matrix may be used in one of the structural forms detailed in the Pei application. The foregoing heat treatment thermally in situ crystallized the tubing and the interposed frit material and produced a glass-ceramic matrix. The heat treatment has fusion bonded the walls of each tube to those of adjacent tubes and to the frit material in the interstices between the tubes and reformed the tubes to a substantially hexagonal shape. The open frontal area is greater than 65 percent.

This example is set forth to illustrate that the powdered low expansion crystallizable frit may consist of a mixture of two different compositions I and II of Table II which have different coefficients of lineal thermal expansion to obtain a mixture having an overall coefficient of lineal thermal expansion which substantially matches the still different coefficient of lineal expansion of the tubing which is formed from composition III of Table I, when all have been thermally crystallized into the glass-ceramic matrix. Moreover, mixtures of different frit compositions may be used to obtain desirable or matching chemical characteristics.

EXAMPLE II

Glass tubing formed from composition I of Table I having an average outside diameter of 0.030 inch, average inside diameter of 0.026 inch, and an average wall thickness of 0.002 inch and having an average length of 3.5 inches, the tubing having closed ends, are closely packed into a mold similar to that illustrated in FIG. 1. Prior to assembly the tubes are coated with a slurry containing a finely divided frit consisting of composition III of Table II, in a vehicle consisting of amyl acetate with 1.2% nitrocellulose, in a ratio of 3.5:1 to 2:1 (by weight) solids to vehicle.

The mold, tubes and frit coating are then combined into the assembly 25 of FIG. 4 and heated in a furnace on the following schedule:

| Temperature | Time or Rate |
|---|---|
| Ambient to 900°F | 100°per hour |
| Hold 900°F | 2 hours |
| 900°F to 1300°F | 100°F per hour |
| 1300°F to 1375°F | 10°F/hr |
| Hold 1375°F | 24 hours |
| 1375°F to 1725°F | 10°F/hr |
| Hold 1725°F | 24 hours |
| 1725°F to 1800°F | 5°F/hr |
| Hold 1800°F | 6 hours |
| 1800°F to 1500°F | 50°F/hr |
| 1500°F to ambient | 150°F/hour |

Tube ends saw cut off prior to second heat treatment schedule, as follows:

| | |
|---|---|
| Ambient to 1800°F | 100°F/hr |
| 1800°F to 2100°F | 50°F/hr |
| Hold 2100°F | 6 hours |
| 2100°F to 1700°F | 50°F/hr |
| 1700°F to ambient | 300°F/hr |

The annealing point of glass composition I is about 1320°F.

After the foregoing heat treatment a glass-ceramic matrix results with the same structural and low expansion characteristics as those described for the glass-ceramic matrix of EXAMPLE I.

This example is provided to illustrate that it is frequently desirable to use a frit composition which is the same as the composition of the glass tubing to obtain substantially the same coefficient of lineal expansion throughout the glass-ceramic matrix. This example further illustrates that a two step heat treatment may be used in which a constrained bundle of sealed tubing and frit interposed in the interstices between the tubing is first heated to expand or bloat the tubes for initial fusion and to heat the tubes and frit to a temperature range in the maximum nucleation range. The first step induces a glassy sintering of the material, wherein the material is not fully crystallized, is partially transparent, and is in a high quartz form. The second step or final heat treatment converts the tubing and frit into full opacity or substantially full crystallization as a glass-ceramic matrix. This two step process is useful for materials that cannot stand the mechanical and chemical strains of the one step or "unified" heat treatment cycle described in EXAMPLE I.

The vehicle used for the slurrys in EXAMPLES I and II is exemplary only and was chosen for the characteristics of a good initial drying speed provided by the amyl acetate solvent for the nitrocellulose, and for the ability of the nitrocellulose to bind the frit particles together to provide good green-ware handling properties.

In EXAMPLES I and II hereinbefore, the powdered low expansion crystallizable glass was interposed in the interstices between tubes by coating the tubing with a slurry containing the powdered frit before the tubing was assembles in a mold.

There are other methods of interposing the frit in the interstices. For example, there is shown in FIG. 7 an assembly of tubes 22 in a ring mold 10. The tubes 22 may be retained in the mold 10 by a stainless steel plate 26 placed below the mold and having a silica-alumina cloth 27 on its upper surface. The components just described comprise a portion of the assembly 25 shown in FIG. 4.

A vibrator mechansim indicated generally at 40 is suitably mechanically coupled to the plate 26. The plate 26, cloth 27 and mold 10 may be clamped or otherwise held together to prevent disassembly in response to vibration imparted thereto by the vibrator 40.

A layer 50 of finely divided frit in dry or slurry form may then be placed across the open top of mold 10 above the assembly of closely packed tubes 22. In response to vibration imparted to the tubes 22 and the mold 10, the powdered or finely divided frit 50 will settle into the interstices between the tubes. Additional layers may be added as the first layer 50 finds its way into the interstices until the interstices are filled to the desired capacity.

The remaining components of the assembly 25, shown in FIG. 4, are then added to the plate 27, cloth 26 and mold 10, and the assembly 25 is ready for heat treatment.

Alternatively, the vibrator 40 may be replaced by a reduced pressure source which communicates with the lower ends of tubes 22 in mold 10 via a foraminous support for the tubes 22 and mold 10. The layer 50 of powdered frit is then drawn into the interstices between tubes by the reduction of pressure in the interstices. When the desired amount of finely divided frit is in the interstices, the mold 10, tubes 22, and the frit 50 in the intersitces is combined in the assembly 25 of FIG. 4 for heat treatment.

Although the invention has been described thus far in terms of providing powdered low expansion crystallizable glass in the interstices between the tubing, it should be noted that low expansion crystallizable glass may be provided in the interstices in other forms. For example, in FIG. 6 there is shown a section of tubes 22 from a constrained bundle. Interposed in the interstices between the tubes are rods 60 of low expansion crystallizable glass. The composition of the tubes 22 and rods 60 may be chosen from the tables hereinbefore with the thermal expansion characteristics of each being kept in mind while selecting.

A constrained bundle of tubes 22 with rods 60 in the interstices may be jointly thermally processed in the manner set forth in EXAMPLES I and II hereinbefore to form an integral glass-ceramic matrix of the type described with improved radial strength and improved wear-resistance on an open end face. Since the tubes are relatively more dense for the same space than the powdered frit discussed hereinbefore, the expansion of the tubes would be reduced, giving a degree of porosity control for the matrix.

It should also be noted that the matrix of this invention may be and in one embodiment is formed with an integral rim, integral hub, or an integral rim and hub of low expansion crystallizable glass having substantially the same thermal expansion characteristics as the matrix, in the manner described in the hereinbefore referenced Pei application. The use of additional low expansion crystallizable glass is powdered, slurry or rod form in interstices between the outer row of tubing and a rim and/or between an inner row of tubing and a hub, or between any bundle of tubing and a support therefor, provides an additional adhering and reinforcing mass to be formed between the tubes and a support when the whole assembly is jointly thermally processed to form an integral glass-ceramic matrix and support.

This invention then provides an improved method of assembling and forming a matrix with a support such as a rim or a hub, and to seal the hub or rim to the matrix during the forming heat treatment.

Further, it may be desirable for certain applications to control the porosity of the matrix. Therefore, the pack density of the tubes and added low expansion glass may be controlled in that the number of tubes in a given size matrix may be reduced while more of the added low expansion glass is used to take up the space vacated by the reduced number of tubes. The density of the added low expansion glass between the tubes may be increased through the use of rods or more firmly packed powdered frit so that the expansion of the closed tubes is controlled. This assembly may be thermally processed as described hereinbefore.

It should further be noted that ordinary sinterable ceramic powders or rods having a very low expansion may be useful for certain applications. These powders will sinter or adhere together and to the tubes creating a fusion chemical bond between particles and the tubes. While there is normally a reduction in size of these powdered particles and rods when sintered, they can be used in the matrix formation herein because of the compensating expansion of the tubes, as long as the resultant thermal expansion and chemical characteristics are compatible with the tubing in the matrix being formed.

For many applications, particularly when the matrix is used as a heat exchanger, a low expansion and heat-/thermal shock resistant matrix is required. For instance, when used as a regenerator in a gas turbine, hot gas from the turbine can be passed through a rotating open-ended matrix in one direction, while cold incoming air is passed through the matrix in the opposite direction, picking up heat from the matrix passageways.

Therefore, a preferred embodiment of this invention utilizes thermally crystallizable glass compositions for the tubes which in their crystallized state,
1. have essentially zero porosity,
2. consist essentially of an inorganic crystalline oxide ceramic material,
3. have an average coefficient of lineal thermal expansion of about $-12$ to $+12 \times 10^{-7}/°C$ in a range $0°-300°C$, and preferably a coefficient of about $-5$ to $+5 \times 10^{-7}/°C$ in a range $0°-300°C$. and
4. a thermal conductivity of less than 0.01 cal/cm/sec/cm$^2$/°C at 400°C.

When the matrix tubes have such a coefficient of expansion it is preferred, also, that the expansion coefficient of the interstitial material also be in the $-12$ to $+12$ (preferably $-5$ to $+5$) $\times 10^{-7}/°C$ range over the temperature range $0°-300°C$.

As used herein the term "glass-ceramic" is an inorganic crystalline oxide ceramic material containing a multiplicity of extremely small inorganic oxide crystals in random orientation throughout the mass of the material, which glass-ceramic is formed by the thermal in situ bulk crystallization of a glass.

Also as used herein the term "inner diameter" refers to the shortest distance through the center of the tube or passageway from one inner wall to the opposite inner wall. This distance is the same for all diameters of a circle, of course, but for a hexagon, for instance, the "diameter" defined herein is the distance of a line through the center of a hexagon and perpendicular to the opposite side walls of the hexagon.

While there have been shown and described and pointed out the fundamental novel features of the invention with a reference to the preferred embodiments thereof, those skilled in the art will recognize that various changes, substitutions, omissions and modifications in the methods and structures described may be made by those skilled in the art without departing from the spirit of the invention.

I claim:
1. A method for making heat exchange apparatus comprising an assembly of integrally fused tubes forming a series of smooth, longitudinal passageways therethrough, which comprises
   a. tightly packing together a thermally of elongated tubes made of a glass that is thmally crystallizable to a low expansion glass-ceramic, each of the tubes being sealed at each end and containing an expansible fluid medium,
   b. providing in the interstices between the packed tubes additional glass that is also thermally crystallizable to a low expansion glass-ceramic, said additional glass having substantially the same thermal expansion characteristics as said glass tubes when both are thermally crystallized to a glass-ceramic,
   c. constraining the tightly packed tubes against peripherally outward movement from their packed configuration
   d. subjecting said constrained tightly packed tubes and the interstitially disposed additional glass to a temperature sufficient to soften both the tubes and the interstitial glass and thus cause said fluid medium entrapped in said tubes to urge the tubes into tight contact with adjacent tubes and to compact said additional glass in the interstices between said tubes, thereby to aid in the fusion of such tubes to each other and to said additional glass in the interstices, and
   e. subjecting said tubes and said interstitial glass to a temperature sufficient to crystallize the assembly of tubes and interstitial glass into an integral glass-ceramic mass.

2. A method as defined in claim 1 in which
   a. said softening temperature is above the annealing temperature point of said tubes and interstitial glass and in a temperature range in which said tubes and interstitial glass nucleates during said expansion and fusion, and which further includes
   b. thereafter further heating the tubes and interstitial glass to a second temperature higher than said softening and nucleating temperature to effect crystallization of said tubes and interstitial glass into an integral fused matrix of glass-ceramic having a low coefficient of lineal thermal expansion.

3. A method as defined in claim 2 wherein
   a. said tubes are tightly packed within an inorganic crystalline oxide ceramic rim and are constrained from outward movement by said rim,
   b. quantities of said additional glass being provided in the interstices between the rim and tubes adjacent the rim,

15 c. said tubes adjacent the rim and the rim-adjacent additional glass fusion bonding to each other and to said rim during the heat treatment steps, d. said rim having a coefficient of thermal expansion substantially the same as that of said expanded and fused glass-ceramic tubes.

4. A method as defined in claim 2 wherein a. said tubes are tightly packed about an inorganic crystalline oxide ceramic hub disposed centrally of said packed tubes, b. quantities of said additional glass being provided in the interstices between said hub and the tubes adjacent the hub, c. said tubes adjacent the hub and the hub-adjacent additional glass fusion bonding to each other and to said hub during the heat treatment steps, d. said hub having a coefficient of thermal expansion substantially the same as that of said expanded and fused glass-ceramic tubes.

5. The method as defined in claim 2 wherein said thermally crystallizable glass tubes have a wall thickness sufficient to permit substantially complete expansion of said glass tubes by the fluid medium therein during the heat treatment to meet with and fuse with said additional glass in the interstices to substantially fill the interstices and provide support for the tube walls at the filled interstitial areas.

6. A method according to claim 5 wherein the ratio of inner diameter of each tube to the wall thickness of that tube is at least 6.

7. A method for making heat exchange apparatus comprising an assembly of integrally fused tubes forming a series of smooth, longitudinal passageways therethrough, wherein the walls defining said passageways have essentially zero porosity and an average coefficient of lineal thermal expansion of about $-18$ to $+50 \times 10^{-7}/°C$, over the range $0°-300°C$, which comprises a. bundling together into a desired configuration a plurality of elongated tubes made of a glass that is thermally crystallizable to a low expansion glass-ceramic having a coefficient of lineal thermal expansion of about $-18$ to $+50 \times 10^{-7}/°C$ over the range $0°-300°C$, each of the tubes being sealed at each end and containing an expansible fluid medium, b. providing in the interstices between the bundled tubes additional glass that is also thermally crystallizable to a low expansion glass-ceramic having a coefficient of lineal thermal expansion of about $-18$ to $+50 \times 10^{-7}/°C$ over the range $0°-300°C$, c. constraining the bundle of tubes against movement from the desired final configuration, d. subjecting said constrained bundle of tubes and the interstitially disposed additional glass to a temperature sufficient to soften said tubes and said interstitial glass and to cause said fluid medium entrapped in said tubes to urge said tubes into tight contact with adjacent tubes and said interstitial glass, thereby to aid the fusion of such tubes to each other and to said interstitial glass, said temperature being in the range of 50 to 250°F above the annealing point of said tubes and interstitial glass, in which temperature range said tubes and said interstitial glass nucleates during said expansion and fusion, e. thereafter jointly heating said tubes and interstitial glass at a rate of at least 50°F per hour to a higher temperature than the temperature in step (d) in the range of 200° to 500°F above said original annealing point, and f. finally heating said fused matrix in a temperature range of from 1,800° to 2,300°F and thereby completing crystallization thereof to a glass-ceramic having an expansion in the range aforementioned.

8. A method as defined in claim 7 wherein the step of providing additional glass in the interstices between the tubes is carried out by mixing a powdered glass into a liquid vehicle, and coating the exterior surfaces of the sealed tubes with the powdered glass in the vehicle.

9. A method as defined in claim 8 in which the ratio of powdered glass to the liquid vehicle is in the range of 3.5:1 to 2:1 by weight.

10. A method as defined in claim 8 in which the liquid vehicle is amyl acetate with 1.2% nitrocellulose.

11. A method as defined in claim 7 wherein the step of providing additional glass in the interstices between the tubes is carried out by finely dividing the additional glass and urging the finely divided additional glass between the sealed tubes in the bundle.

12. A method as defined in claim 7 wherein the step of providing additional glass in the interstices is carried out by placing rods of the additional glass between the tubes in the bundle.

13. A method as defined in claim 7 wherein the average coefficient of lineal thermal expansion for said thermally crystallized tubes, thermally crystallized interstitial glass, and matrix is about $-12$ to $+12 \times 10^{-7}/°C$ over the range $0°-300°C$.

14. A method as defined in claim 7 wherein the average coefficient of lineal thermal expansion for said thermally crystallized tubes, thermally crystallized interstitial glass, and matrix is about $-5$ to $+5 \times 10^{-7}/°C$ over the range of $0°-300°C$.

15. A method as defined in claim 7 wherein the ratio of inner diameter of a tube to wall thickness of that tube is at least 7.2.

16. In the method of reinforcing heat exchange apparatus formed from a plurality of tightly packed individual axially elongated tubes formed from thermally crystallizable glass and arranged in a tightly packed assembly, each tube having its opposite ends initially sealed to retain an expansible fluid medium therein, comprising the steps of a. interposing between the individual sealed tubes a finely divided thermally crystallizable frit, b. peripherally restraining the assembled tubes, c. jointly thermally processing both the tubes and the frit to generate internal pressure in the closed tubes and to soften the tube walls and the frit to permit tube expansion and frit compaction to form the tube-frit assembly into an integral mass, and d. jointly thermally processing both the tubes and the frit through successive nucleating and crystallizing steps to convert both the tubes and the frit into a crystallized glass ceramic.

17. The method as defined in claim 16 wherein the step of interposing is carried out by coating the exterior surfaces of the sealed tubes with the frit carried in a liquid vehicle.

18. The method as defined in claim 16 wherein the step of interposing is carried out by sifting dry powdered frit between the sealed tubes.

19. The method as defined in claim 16 which further includes the step of removing the sealed ends of said tubes to open the ends of said tubes, the sintered frit material therebetween reinforcing the integral assembly and the open ends of the tubes.

* * * * *

PO-1050
(5/69)

UNITED STATES PATENT OFFICE
CERTIFICATE OF CORRECTION

Patent No. 3,773,484      Dated November 20, 1973

Inventor(s) Marion I. Gray, Jr.

It is certified that error appears in the above-identified patent and that said Letters Patent are hereby corrected as shown below:

Cover page, Abstract, fifth from last line, "end" should be
--ends--.

Col. 3, line 45, "11" should be --22--;
    line 67, "fully" should be --finally--.
Col. 4, line 9, "firt" should be --frit--;
    line 67, "apredetermined" should be --a predetermined--.
Col. 5, line 52, "interstially" should be --interstitially--;
    line 57, "interstial" should be --interstitial--.
Col. 7, line 31, "U.S.Pat." should be --patent--.
Col. 8, line 32, "liquids" should be --liquidus--;
Col. 9, line 9, "netword" should be --network--;
    line 39, "per-heat" should be --pre-heat--.
Col. 10, line 4, "beta-eucriptite-like" should be --beta-eucryptite-like--.

Col. 11, line 66, "is" should be --in--.
Col. 12, line 24, "27" should be --26--;
    line 25, "26" should be --27--.
CLAIM 1 (Col. 14, line 20) "thermally" should be --multiplicity--;
    (Col. 14, line 21) "thmally" should be --thermally--.

Signed and sealed this 7th day of May 1974.

(SEAL)
Attest:

EDWARD M. FLETCHER, JR.
Attesting Officer

C. MARSHALL DANN
Commissioner of Patents